E. W. FAIRCHILD.
COLOR CHART OR GUIDE.
APPLICATION FILED JULY 31, 1909.
975,341.
Patented Nov. 8, 1910.
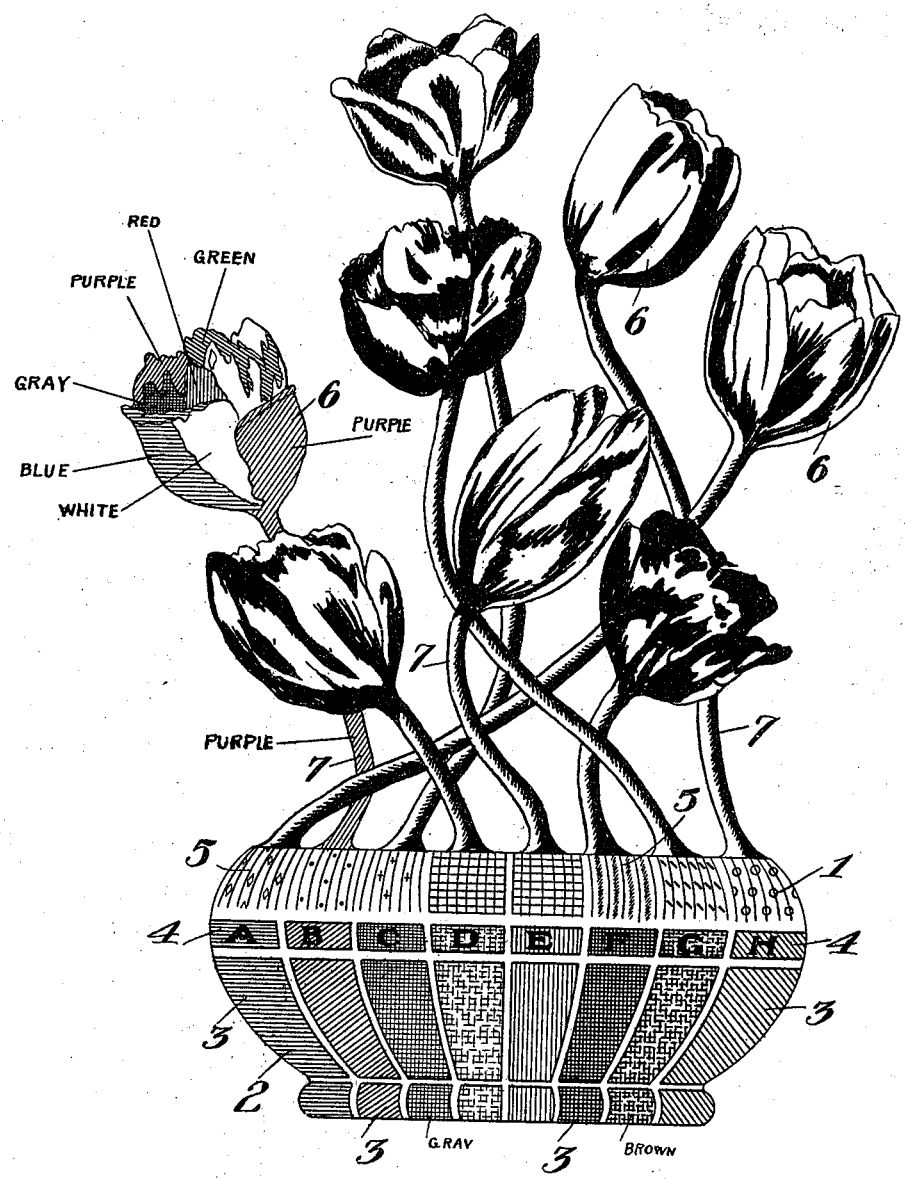

UNITED STATES PATENT OFFICE.

EDMUND W. FAIRCHILD, OF GLEN RIDGE, NEW JERSEY.

COLOR CHART OR GUIDE.

975,341.  Specification of Letters Patent.  Patented Nov. 8, 1910.

Application filed July 31, 1909. Serial No. 510,687.

*To all whom it may concern:*

Be it known that I, EDMUND W. FAIRCHILD, a citizen of the United States, residing at Glen Ridge, in the county of Essex and State of New Jersey, have invented certain new and useful Improvements in Color Charts or Guides, of which the following is a specification.

The invention relates to that class of charts, commonly designated "color charts" for indicating a primary color and the various shades thereof, the object being to enable persons, unskilled in the art of harmonizing colors, to readily and accurately select or determine the various colors which will harmonize or contrast with a predetermined or primary color; and it consists in applying upon a suitable back-ground a figure or other object, by means of which a person may readily and correctly determine or select the various colors which harmonize or contrast with the predetermined color desired.

An embodiment of the invention is illustrated in the accompanying drawing, in which the figure represents a plan view of my improved chart.

Displayed upon a suitable back-ground 1, of any desired neutral tint, is a representation of a pot of growing flowers, such, for instance, as tulips. The pot or other receptacle, as 2, is divided into a plurality of distinctive color spaces 3, designated for convenience of description as "primary colors". Arranged above the primary color-spaces is an equal number of smaller color-spaces 4, each corresponding with the color-space below it and arranged above the spaces 4 is an equal number of spaces 5, each containing a design in the color corresponding with the color of the particular color-spaces 4 and 3 beneath it, all of the colors being shaded upwardly. Each flower 6 is provided with a stem 7, each of which is colored to correspond with the primary color with which it is associated or connected. Each flower contains or displays the various colors which harmonize with the particular primary color with which it is associated.

The color chart may be employed in various ways, as will be obvious. For example, if the primary color of any particular color-space represents the predominant color of shirting, the flower connected with such color will contain or display the various colors which will harmonize therewith. For instance, B being purple and the shirt or other article solid purple, or a purple pattern on a white ground, the flower associated or connected therewith, by the purple stem, shows the colors, any one of which can be harmoniously worn in a scarf, necktie, waistcoat, gloves, hose, or jewelry. F being distinctive for mourning, the flower connected therewith shows colors permissible with black and white as mourning. Black and white, however, being found in all of the other flowers, can be worn with any color. Thus it will seem that, by means of the chart, a person may suit his taste and, at the same time, feel assured of the proper harmony of color.

While the chart is designed particularly as a dress-guide, its scope is by no means limited thereto, inasmuch as it can be particularly employed in working out color schemes, for instance in the decoration of windows, and the interior of stores, and even to selecting the most tasteful colors for furniture, fixtures, and the like. It may also be employed as a guide in producing new color-ranges in fabric and pattern combinations. In fact, it may be successfully employed in connection with any work into which the color problem enters.

Having thus fully described my invention, what I claim is:—

1. A chart having thereon a predetermined primary color connected, by a line of corresponding color, with an object containing or displaying various shades of colors which harmonize with the primary color.

2. A color chart having thereon a plurality of primary colors, each primary color being connected, by a line of corresponding color, with an object containing or displaying various shades of colors which harmonize with the primary color with which it is connected.

3. A chart having a plurality of primary color-spaces, comprising a suitable figure or object, each color-space being connected, by a line of corresponding color, with a flower containing or displaying various shades of colors which harmonize with the primary color with which it is connected.

4. A color chart having in representation a pot of flowers, the pot being divided into a number of primary color-spaces, each of said spaces being connected with a flower containing or displaying various shades of colors which harmonize with the particular primary color with which it is connected.

5. A color chart having in representation a pot of flowers, the pot being divided into a number of primary color-spaces, each of which is connected with a flower by a line of color corresponding with such space, each flower containing or displaying various shades of colors which harmonize with the particular color with which it is connected.

6. A color chart representing a pot of flowers, said pot being divided into a number of primary color-spaces, each of which terminates in a design displaying a color corresponding with the color of its particular space, and each of said design spaces being connected with a flower by a line of color corresponding with such space and its primary color-space, each flower containing or displaying various shades of colors which harmonize with the particular color with which it is connected.

In testimony whereof I affix my signature in presence of two witnesses.

EDMUND W. FAIRCHILD.

Witnesses:
  GEO. O. GLAVIS,
  H. MURRAY GLASS.